United States Patent
Koopmans et al.

(10) Patent No.: US 11,299,577 B2
(45) Date of Patent: *Apr. 12, 2022

(54) METHOD FOR THE PRODUCTION OF THERMOPLASTIC POLYOXAZOLIDINONE POLYMERS

(71) Applicant: Covestro Deutschland AG, Leverkusen (DE)

(72) Inventors: Carsten Koopmans, Hilden (DE); Christoph Guertler, Cologne (DE); Aurel Wolf, Wülfrath (DE); Elena Frick-Delaittre, Cologne (DE); Kai Laemmerhold, Aachen (DE); Claudine Rangheard, Munich (DE); Timo Breuer, Kerpen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/642,147

(22) PCT Filed: Sep. 11, 2018

(86) PCT No.: PCT/EP2018/074418
§ 371 (c)(1),
(2) Date: Feb. 26, 2020

(87) PCT Pub. No.: WO2019/052991
PCT Pub. Date: Mar. 21, 2019

(65) Prior Publication Data
US 2020/0385507 A1   Dec. 10, 2020

(30) Foreign Application Priority Data
Sep. 15, 2017 (EP) .................... 17191374

(51) Int. Cl.
| C08G 18/00 | (2006.01) |
| C08G 18/08 | (2006.01) |
| C08G 18/22 | (2006.01) |
| C08G 18/71 | (2006.01) |
| C08G 18/76 | (2006.01) |
| C08G 18/83 | (2006.01) |

(52) U.S. Cl.
CPC ....... *C08G 18/003* (2013.01); *C08G 18/0852* (2013.01); *C08G 18/225* (2013.01); *C08G 18/71* (2013.01); *C08G 18/7621* (2013.01); *C08G 18/7671* (2013.01); *C08G 18/831* (2013.01)

(58) Field of Classification Search
CPC .... C08G 18/003; C08G 18/831; C08G 18/71; C08G 18/7671; C08G 18/7621; C08G 18/225; C08G 18/0852
See application file for complete search history.

(56) References Cited

U.S. PATENT DOCUMENTS

| 9,458,281 | B2 | 10/2016 | Mueller et al. | |
| 10,385,167 | B2 * | 8/2019 | Muller | C08G 71/00 |
| 2017/0081462 | A1 * | 3/2017 | Muller | C07D 263/22 |

FOREIGN PATENT DOCUMENTS

| EP | 3357949 A1 | 8/2018 |
| WO | 9955772 | 11/1999 |
| WO | 2016128380 A1 | 8/2016 |

OTHER PUBLICATIONS

Dyen, M. E. and Swern, D., Chem. Rev., 67,197, 1967, "2-Oxazolidones".
Herweh, J.E. and Whitmore, W.Y., J. Polym. Sci. 8 (1970) 2759-2773, "Poly-2-oxazolidones: Preparation and Characterization".
International Search Report, PCT/EP2018/074418, dated Oct. 11, 2018, Authorized officer: Martin Bergmeier.

* cited by examiner

*Primary Examiner* — Rabon A Sergent
(74) *Attorney, Agent, or Firm* — Donald R. Palladino

(57) ABSTRACT

A process for producing thermoplastic polyoxazolidinone comprising copolymerization of a diisocyanate compound (A) with a bisepoxide compound (B) in the presence of a catalyst (C) and a compound (D) in a solvent (E), wherein the catalyst (C) is selected from the group consisting of alkali halogenides and earth alkali halogenides, and transition metal halogenides, compound (D) is selected from the group consisting of monofunctional isocyanate, monofunctional epoxide, and wherein the process comprises step (α) of placing the solvent (E) and the catalyst (C) in a reactor to provide a mixture, and adding the diisocyanate compound (A), the bisepoxide compound (B) and the compound (D) in step (β) to the mixture resulting from the step (α). The invention is also related to the resulting thermoplastic polyoxazolidinone.

20 Claims, No Drawings

METHOD FOR THE PRODUCTION OF THERMOPLASTIC POLYOXAZOLIDINONE POLYMERS

CROSS-REFERENCE TO RELATED APPLICATION

This application is a national stage application under 35 U.S.C. § 371 of PCT/EP2018/074418, filed Sep. 11, 2018, which claims the benefit of European Application No. 17191374.2, filed Sep. 15, 2017, each of which is incorporated herein by reference.

FIELD

A process for producing thermoplastic polyoxazolidinone comprising copolymerization of a diisocyanate compound (A) with a bisepoxide compound (B) in the presence of a catalyst (C) and a compound (D) in a solvent (E), wherein the catalyst (C) is selected from the group consisting of alkali halogenides and earth alkali halogenides, and transition metal halogenides, compound (D) is selected from the group consisting of monofunctional isocyanate, monofunctional epoxide, and wherein the process comprises step ($\alpha$) of placing the solvent (E) and the catalyst (C) in a reactor to provide a mixture, and adding the diisocyanate compound (A), the bisepoxide compound (B) and the compound (D) in step ($\beta$) to the mixture resulting from the step ($\alpha$). The invention is also related to the resulting thermoplastic polyoxazolidinone.

BACKGROUND

Oxazolidinones are widely used structural motifs in pharmaceutical applications and the cycloaddition of epoxides and isocyanates seems to be a convenient one-pot synthetic route to it. Expensive catalysts, reactive polar solvents, long reaction times and low chemoselectivities are common in early reports for the synthesis of oxazolidinones (M. E. Dyen and D. Swern, Chem. Rev., 67, 197, 1967). Due to these disadvantages there was the need for alternative methods for the production of oxazolidinones especially for application of oxazolidinones as structural motif in polymer applications.

EP 16703330.7 discloses thermoplastic polyoxazolidinones with thermal stability, a method for the production of thermoplastic polyoxazolidinones, comprising the step of reacting a biscarbamate or diisocyanate compound with a bisepoxide compound in the presence of a mono-carbamate, a mono-isocyanate and/or a mono-epoxide compound as chain regulator and a suitable base having a pKb value of ≤9 as catalyst. Polyoxazolidinones are obtained by the polycondensation route, wherein biscarbamates and bisepoxides reacted in the presence of amine catalysts in batch mode or semi-batch mode. The chain group regulators were added in a second step.

In addition, one example discloses the polyoxazolidinone formation by polyaddition route, wherein the diisocyanate compound is added in a semi-batch process to the mixture of a bisepoxide compound and the catalyst. After 16 h a monofunctional isocyanate compound was added to the polyoxazolidinone mixture. The overall reaction time was 22 hours.

The non-published patent application EP 17154416.6 discloses a method for the production of thermoplastic polyoxazolidinones with slightly increased dynamic viscosity and also increased thermal stability by controlling the regioselectivity of the 5-oxazolidinone and 4-oxazolidinone regioisomers. The polyoxazolidinones are obtained by the polycondensation route which comprises at least one biscarbamate compound with at least one bisepoxide compound in the presence of at least one base, at least one Lewis acid catalyst, and optionally at least one chain group regulator, wherein the chain group regulator comprising a mono-carbamate group, a mono-isocyanate group and/or a mono-epoxide group, and wherein the base having a pKb-value of ≤9. In a first step the biscarbamate compound is reacted with the bisepoxide compound in the presence of a base and a Lewis acid catalyst in batch process followed by the addition of a monofunctional chain group regulator in a second step.

The scientific publication J. Polym. Sci. 8 (1970) 2759-2773 discloses polyoxazolidinones prepared from various bisepoxides and various diisocyanates in the presence of alkaline metal halogenide catalysts. A solution of equimolar bisepoxide and diisocyanate amounts is added dropwise to a reactor containing a LiCl catalyst dissolved in DMF under reflux conditions within 1 h and a subsequent post reaction of 12 to 23 h was carried out under reflux conditions in order to complete the reaction. The addition of monofunctional chain-group regulators is not disclosed.

SUMMARY

Objective of the present invention was therefore to identify an optimized and simple process for the preparation of thermoplastic polyoxazolidinones with improved thermal stability than the already known thermoplastic polyoxazolidinones by the polyaddition route and especially to develop suitable process conditions. The high thermal stability of the synthesized thermoplastic polyoxazolidinones at temperatures up to 240° C. to 260° C. for several minutes is crucial for subsequent extrusion and injection molding processes that need to be carried out above the glass transition temperature of the thermoplastic polyoxazolidinone materials.

In addition, the latter process conditions should enable a high reactivity and reduce the reaction time to already known processes for the preparation of thermoplastic polyoxazolidinones by the polyaddition route to establish an economic process and a high selectivity towards thermoplastic polyoxazolidinone formation to minimize costs for downstreaming and optimize the performance of resulting thermoplastic polyoxazolidinones. Due to the reduced number of side products that can decompose and/or evaporate during subsequent extrusion and injection molding processes compared to the known system higher thermostability (higher decomposition temperature $T_{Donset}$) than the already known thermoplastic polyoxazolidinones should be obtained.

Surprisingly, it has been found that the problem can be solved by process for producing thermoplastic polyoxazolidinones comprising copolymerization of a diisocyanate compound (A) with a bisepoxide compound (B) in the presence of a catalyst (C) and a compound (D) in a solvent (E), wherein catalyst (C) is selected from the group consisting of alkali halogenides and earth alkali halogenides, and transition metal halogenides, compound (D) is selected from the group consisting of monofunctional isocyanate, monofunctional epoxide, and wherein the process comprises the following steps:

($\alpha$) placing the solvent (E) and the catalyst (C) in a reactor to provide a mixture, and ($\beta$) adding the diisocyanate compound (A), the bisepoxide compound (B) and the compound (D) to the mixture resulting from step ($\alpha$).

In an embodiment of the invention the diisocyanate compound (A), the bisepoxide compound (B) and the compound (D) of step (β) are added in a continuous manner to the mixture of step (α).

In an alternative embodiment of the invention the diisocyanate compound (A), the bisepoxide compound (B) and the compound (D) of step (β) are added in a step-wise manner to the mixture of step (α).

In an embodiment of the invention the diisocyanate compound (A), the bisepoxide compound (B) and the compound (D) are mixed prior the addition to the mixture resulting from step (α)

In an embodiment of the invention the mixture of the diisocyanate compound (A), the bisepoxide compound (B) and the compound (D) of step (β) are added in a continuous manner to the mixture of step (α).

In an alternative embodiment of the invention the mixture of the diisocyanate compound (A), the bisepoxide compound (B) and the compound (D) of step (β) are added in a step-wise manner with two or more individual addition steps to the mixture of step (α).

In an embodiment of the method according to the invention step (α) and/or step (β) is performed at reaction temperatures of ≥130° C. to ≤280° C., preferably at a temperature of ≥140° C. to ≤240° C., more preferred at a temperature of ≥155° C. to ≤210° C. If temperatures below 130° C. are set, the reaction is generally very slow. At temperatures above 280° C., the amount of undesirable secondary products increases considerably.

In an embodiment of the method according to the invention step (α) and/or step (β) is performed at reaction times of 1 h to 20 h, preferably at 1 h to 10 h and more preferably at 1 h to 6 h.

In a preferred embodiment of the method according to the invention step (α) and step (β) is performed at reaction temperatures of ≥130° C. to ≤280° C. and a reaction time of 1 h to 6 h.

DETAILED DESCRIPTION

Diisocyanate Compound (A)

As used herein, the term "diisocyanate compound (A)" is meant to denote compounds having two isocyanate groups (I=2, isocyanate-terminated biurets, isocyanurates, uretdiones, and isocyanate-terminated prepolymers).

In an embodiment of the method according to the invention the diisocyanate compound (A) is at least one compound selected from the group consisting of tetramethylene diisocyanate, hexamethylene diisocyanate (HDI), 2-methylpentamethylene diisocyanate, 2,2,4-trimethyl-hexamethylene diisocyanate (THDI), dodecanemethylene diisocyanate, 1,4-diisocyanatocyclohexane, 3-isocyanatomethyl-3,3,5-trimethylcyclohexyl isocyanate (isophorone diisocyanate, IPDI), diisocyanatodicyclohexylmethane (H12-MDI), diphenylmethane diisocyanate (MDI), 4,4'-diisocyanato-3,3'-dimethyldicyclohexylmethane, 4,4'-diisocyanato-2,2-dicyclohexyl propane, poly(hexamethylene diisocyanate), octamethylene diisocyanate, tolylene-α,4-diisocyanate, poly(propylene glycol) tolylene-2,4-diisocyanate terminated, poly(ethylene adipate) tolylene-2,4-diisocyanate terminated, 2,4,6-trimethyl-1,3-phenylene diisocyanate, 4-chloro-6-methyl-1,3-phenylene diisocyanate, poly[1,4-phenylene diisocyanate-co-poly(1,4-butanediol)]diisocyanate, poly(tetrafluoroethylene oxide-co-difluoromethylene oxide) α,ω-diisocyanate, 1,4-diisocyanatobutane, 1,8-diisocyanatooctane, 1,3-bis(1-isocyanato-1-methylethyl)benzene, 3,3'-dimethyl-4,4'-biphenylene diisocyanate, naphthalene-1,5-diisocyanate, 1,3-phenylene diisocyanate, 1,4-diisocyanatobenzene, 2,4- or 2,5- and 2,6-diisocyanatotoluene (TDI) or mixtures of these isomers, 4,4'-, 2,4'- or 2,2'-diisocyanatodiphenylmethane or mixtures of these isomers, 4,4'-, 2,4'- or 2,2'-diisocyanato-2,2-diphenylpropane-p-xylene diisocyanate and α,α,α',α'-tetramethyl-m- or -p-xylene diisocyanate (TMXDI) or biurets, isocyanurates or uretdiones of the aforementioned isocyanates.

More preferred the diisocyanate compound (A) is selected from the group comprising of tolylene-α,4-diisocyanate, poly(propylene glycol) tolylene-2,4-diisocyanate terminated, 2,4,6-trimethyl-1,3-phenylene diisocyanate, 4-chloro-6-methyl-1,3-phenylene diisocyanate, 3,3'-dimethyl-4,4'-biphenylene diisocyanate, 4,4'-, 2,4'- or 2,2'-diisocyanatodiphenylmethane or mixtures of these isomers, 4,4'-, 2,4'- or 2,2'-diisocyanato-2,2-diphenylpropane-p-xylene diisocyanate and α,α,α',α'-tetramethyl-m- or -p-xylene diisocyanate (TMXDI), diphenylmethane diisocyanate (MDI), naphthalene-1,5-diisocyanate, 1,3-phenylene diisocyanate, 1,4-diisocyanatobenzene, 2,4- or 2,5- and 2,6-diisocyanatotoluene (TDI) or mixtures of these isomers.

And most preferred the diisocyanate compound (A) is selected from the group consisting of diphenylmethane diisocyanate (MDI), naphthalene-1,5-diisocyanate, 1,3-phenylene diisocyanate, 1,4-diisocyanatobenzene, 2,4- or 2,5- and 2,6-diisocyanatotoluene (TDI) or mixtures of these isomers.

A mixture of two or more of the aforementioned diisocyanate compounds (A) can also be used.

Bisepoxide Compound (B)

As used herein, the term "bisepoxide compound (B)" is meant to denote compounds having two epoxide groups (F=2).

In a preferred embodiment of the invention the bisepoxide compound (B) is at least one compound selected from the group consisting of resorcinol diglycidyl ether, neopentyl glycol diglycidyl ether, 1,6-hexanediol diglycidyl ether, 1,4-butandiol diglycidyl ether, hydrogenated bisphenol-A diglycidyl ether, bisphenol-A diglycidyl ether, bisphenol-F diglycidyl ether, bisphenol-S diglycidyl ether, 9,9-bis(4-glycidyloxy phenyl)fluorine, tetrabromo bisphenol-A diglycidyl ether, tetrachloro bisphenol-A diglycidyl ether, tetramethyl bisphenol-A diglycidyl ether, tetramethyl bisphenol-F diglycidyl ether, tetramethyl bisphenol-S diglycidyl ether, diglycidyl terephthalate, diglycidyl o-phthalate, 1,4-cyclohexane dicarboxylic acid diglycidyl ester, ethylene glycol diglycidyl ether, polyethylene glycol diglycidyl ether, diethylene glycol diglycidyl ether, propylene glycol diglycidyl ether, dipropylene glycol diglycidyl ether, polypropylene glycol diglycidyl ether, polybutadiene diglycidyl ether, butadiene diepoxide, vinylcyclohexene diepoxide, limonene diepoxide, the diepoxides of double unsaturated fatty acid C1-C18 alkyl esters, 2-dihydroxybenzene diglycidyl ether, 1,4-dihydroxybenzene diglycidyl ether, 4,4'-(3,3,5-trimethylcyclohexyliden)bisphenyl diglycidyl ether and diglycidyl isophthalate.

More preferred the bisepoxide compound (B) is selected from the group consisting of resorcinol diglycidyl ether, bisphenol A diglycidyl ether, and bisphenol F diglycidyl ether.

Most preferred the bisepoxide compound (B) is selected from the group consisting of bisphenol A diglycidyl ether, and bisphenol F diglycidyl ether.

A mixture of two or more of the aforementioned bisepoxide compounds (B) can also be used.

The molecular weight of the obtained thermoplastic polyoxazolidinone is determined by the molar ratio of the bisepoxide compound (B) relative to diisocyanate compound (A) and optionally relative to the compound (D).

The molar ratio of bisepoxide compound (B) to diisocyanate compound (A) is preferably in the range from 1:2 to 2:1, more preferably in the range from 45:55 to 55/45 and even more preferably in the range 47.8:52.2 to 52.2:47.8.

When the diisocyanate compound (A) is employed in excess, preferably a mono-epoxide is employed as compound (D). When the bisepoxide compound (B) is employed in excess, preferably a mono-isocyanate is employed as compound (D).

Catalyst (C)

In an embodiment of the invention the catalyst (C) is at least one compound selected from the group consisting of LiCl, LiBr, LiI, $MgCl_2$, $MgBr_2$, $MgI_2$, $SmI_3$, preferred LiCl and LiBr, and most preferred LiCl.

In one embodiment of the method according to the invention, the catalyst (C) is present in an amount of ≥0.001 to ≤5.0 weight-%, preferably in an amount of ≥0.01 to ≤3.0 weight-%, more preferred ≥0.05 to ≤0.40 weight-%, based on the theoretical yield of thermoplastic polyoxazolidinone.

Compound (D)

The compounds comprising a mono-epoxide group and/or a mono-isocyanate group are also denoted as "compound (D)" according to the invention. Compounds comprising a mono-isocyanate and/or a mono-epoxide group are preferred compounds and mono-epoxide groups are most preferred compounds (D) according to the invention.

In an embodiment of the invention the method for the production of the thermoplastic polyoxazolidinone is in the presence of the compound (D), wherein the compound (D) acts as a chain regulator for the thermoplastic polyoxazolidinone and further increases the thermal stability of the thermoplastic polyoxazolidinone.

In a preferred embodiment of the invention the compound (D) is at least one compound is selected from the group consisting of 4-tert-butylphenyl glycidyl ether, phenyl glycidyl ether, 1-naphthyl glycidyl ether, 2-naphthyl glycidyl ether, 4-chlorophenyl glycidyl ether, 2,4,6-trichlorophenyl glycidyl ether, 2,4,6-tribromophenyl glycidyl ether, pentafluorophenyl glycidyl ether, cyclohexyl glycidyl ether, benzyl glycidyl ether, glycidyl benzoate, glycidyl acetate, glycidyl cyclohexylcarboxylate, methyl glycidyl ether, ethyl glycidyl ether, butyl glycidyl ether, hexyl glycidyl ether, 2-ethylhexyl glycidyl ether, octyl glycidyl ether, C10-C18 alkyl glycidyl ether, allyl glycidyl ether, ethylene oxide, propylene oxide, styrene oxide, 1,2-butene oxide, 2,3-butene oxide, 1,2-hexene oxide, oxides of C10-C18 alpha-olefins, cyclohexene oxide, vinylcyclohexene monoxide, limonene monoxide, butadiene monoepoxide and/or N-glycidyl phthalimide and/or n-hexylisocyanate, 4-tert-butylphenyl glycidyl ether, cyclohexyl isocyanate, ω-chlorohexamethylene isocyanate, 2-ethyl hexyl isocyanate, n-octyl isocyanate, dodecyl isocyanate, stearyl isocyanate, methyl isocyanate, ethyl isocyanate, butyl isocyanate, isopropyl isocyanate, octadecyl isocyanate, 6-chloro-hexyl isocyanate, cyclohexyl isocyanate, 2,3,4-trimethylcyclohexyl isocyanate, 3,3,5-trimethylcyclohexyl isocyanate, 2-norbornyl methyl isocyanate, decyl isocyanate, dodecyl isocyanate, tetradecyl isocyanate, hexadecyl isocyanate, octadecyl isocyanate, 3-butoxypropyl isocyanate, 3-(2-ethylhexyloxy)-propyl isocyanate, (trimethylsilyl)isocyanate, phenyl isocyanate, ortho-, meta-, para-tolyl isocyanate, chlorophenyl isocyanate (2,3,4-isomers), dichlorophenyl isocyanate, 4-nitrophenyl isocyanate, 3-trifluoromethylphenyl isocyanate, benzyl isocyanate, dimethylphenylisocyanate (technical mixture and individual isomers), 4-dodecylphenylisocyanat, 4-cyclohexyl-phenyl isocyanate, 4-pentylphenyl isocyanate, 4-tert-butyl phenyl isocyanate, 1-naphthyl isocyanate.

In a preferred embodiment of the invention the compound (D) is selected from the group consisting of 4-tert-butylphenyl glycidyl ether, phenyl glycidyl ether, 4-isopropylphenyl isocyanate, and p-tolyl isocyanate.

In one embodiment of the method according to the invention, the compound (D) is present in an amount of ≥0.1 to ≤7.0 weight-%, preferably in an amount of ≥0.2 to ≤5.0 weight-%, more preferred ≥0.5 to ≤3.0 weight-%, based on the theoretical yield of the thermoplastic polyoxazolidinone (O).

In an embodiment of the invention the calculated mass ratio of the sum of diisocyanate compound (A) the bisepoxide compound (B) and the compound (D) with respect to the sum of diisocyanate compound (A) the bisepoxide compound (B) the compound (D) and the solvent (E) in step (α) is from 5 wt-% to 30 wt-%, preferred from 8 wt-% to 26 wt-% and more preferred from 13 wt-% to 24 wt-%. The upper mass ratio of 30 wt-%, preferably 26 wt-% and more preferably 24 wt-% leads to an increased thermal stability of the thermoplastic polyoxazolidinone. The lower mass ratio of 5 wt-%, preferably 8 wt-% and more preferably 13 wt-% leads to less amount of solvent (E) optionally comprising solvent (E-1) that need to be separated and potentially purified. This leads to a more efficient overall process due to energy savings and reduction of solvent amounts.

Solvent (E)

The reaction according to the invention is performed in high boiling non-protic halogenated aromatic solvents, high-boiling non-protic aliphatic heterocyclic solvents, halogenated aromatic or aliphatic heterocyclic solvents.

Suitable solvents (E) are for example organic solvents such as linear or branched alkanes or mixtures of alkanes, toluene, xylene and the isomeric xylene mixtures, mesitylene, mono or polysubstituted halogenated aromatic solvents or halogenated alkane solvents, for example chlorobenzene, dichlorobenzene, dichloromethane, dichloroethane, tetrachloroethane, linear or cyclic ether such as tetrahydrofurane (THF) or methyl-tert-butylether (MTBE), linear or cyclic ester, or polar aprotic solvents such as 1,4-dioxane, acetonitrile, N,N-dimethylformamide (DMF), N,N-dimethylacetamide (DMAc), dimethylsulfoxide (DMSO), cyclic carbonate, such as ethylencarbonate or propylencarbonate, N-methylpyrrolidone (NMP), sulfolane, tetramethylurea, N,N'-dimethylethylenurea or mixtures of the above mentioned solvents and/or with other solvents. Preferred solvents (E) are 1,2-dichlorobenzene, sulfolane and N-methylpyrrolidone (NMP).

Solvent (E-1)

In an embodiment of the invention the solvent (E) comprises a polar aprotic solvent (E-1). Preferred solvents (E-1) are sulfolane, dimethylsulfoxide, gamma-butyrolactone and N-methylpyrrolidone (NMP). The presence of the solvent (E-1) effects a better solubility of the alkali halogenides and earth alkali halogenides, and transition metal halogenides such as LiCl, LiBr, LiBr, and $MgCl_2$ as catalyst (C).

Thermoplastic Polyoxazolidinone (O)

In an embodiment of the invention the thermoplastic polyoxazolidinone is further reacted with at least one compound (F) to thermoplastic polyoxazolidinone (O), wherein the compound (F) is an alkylene oxide. The addition of the compound (F) leads to a further increase of the thermal stability of the thermoplastic polyoxazolidinone (O).

Compound (F)

In an embodiment of the invention the compound (F) is added in a step-wise manner with two or more individual addition steps or in continuous manner to the thermoplastic polyoxazolidinone formed in step (β).

In one embodiment of the method according to the invention, the compound (F) is present in an amount of ≥0.1 to ≤7.0 weight-%, preferably in an amount of ≥0.2 to ≤5.0 weight-%, more preferred ≥0.5 to ≤3.0 weight-%, based on the theoretical yield of the thermoplastic polyoxazolidinone (O).

In an embodiment of the invention the compound (F) is a monofunctional alkylene oxide (F-1) and/or polyfunctional alkylene oxide (F-2).

In a preferred embodiment of the invention the compound (D) and compound (F) is the monofunctional alkylene oxide (F-1).

Monofunctional Alkylene Oxide (F-1)

In an embodiment of the invention wherein the monofunctional alkylene oxide (F-1) is at least one compound selected from the group consisting of phenyl glycidyl ether, o-kresyl glycidyl ether, m-kresyl glycidyl ether, p-kresyl glycidyl ether, 4-tert-butylphenyl glycidyl ether, phenyl glycidyl ether, 1-naphthyl glycidyl ether, 2-naphthyl glycidyl ether, 4-chlorophenyl glycidyl ether, 2,4,6-trichlorophenyl glycidyl ether, 2,4,6-tribromophenyl glycidyl ether, pentafluorophenyl glycidyl ether, cyclohexyl glycidyl ether, benzyl glycidyl ether, glycidyl benzoate, glycidyl acetate, glycidyl cyclohexylcarboxylate, methyl glycidyl ether, ethyl glycidyl ether, butyl glycidyl ether, hexyl glycidyl ether, 2-ethylhexyl glycidyl ether, octyl glycidyl ether, C10-C18 alkyl glycidyl ether, allyl glycidyl ether, ethylene oxide, propylene oxide, styrene oxide, 1,2-butene oxide, 2,3-butene oxide, 1,2-hexene oxide, oxides of C10-C18 alpha-olefines, cyclohexene oxide, vinylcyclohexene monoxide, limonene monoxide and butadiene monoepoxide N-glycidyl phthalimide.

In a more preferred embodiment of the invention the monofunctional alkylene oxide (F-1) is 4-tert-butylphenyl glycidyl ether or phenyl glycidyl ether.

In one embodiment of the method according to the invention, the compound (F-1) is present in an amount of ≥0.1 to ≤7.0 weight-%, preferably in an amount of ≥0.2 to ≤5.0 weight-%, more preferred ≥0.5 to ≤3.0 weight-%, based on the theoretical yield of the thermoplastic polyoxazolidinone (O).

Polyfunctional Alkylene Oxide (F-2)

In an embodiment of the invention the polyfunctional alkylene oxide (F-2) is at least one compound selected from the group consisting of resorcinol diglycidyl ether, neopentyl glycol diglycidyl ether, 1,6-hexanediol diglycidyl ether, 1,4-butanediol diglycidyl ether, hydrogenated bisphenol-A diglycidyl ether, bisphenol-A diglycidyl ether, bisphenol-F diglycidyl ether, bisphenol-S diglycidyl ether, 9,9-bis(4-glycidyloxy phenyl)fluorine, tetrabromo bisphenol-A diglycidyl ether, tetrachloro bisphenol-A diglycidyl ether, tetramethyl bisphenol-A diglycidyl ether, tetramethyl bisphenol-F diglycidyl ether, tetramethyl bisphenol-S diglycidyl ether, diglycidyl terephthalate, diglycidyl o-phthalate, 1,4-cyclohexane dicarboxylic acid diglycidyl ester, ethylene glycol diglycidyl ether, polyethylene glycol diglycidyl ether, diethylene glycol diglycidyl ether, propylene glycol diglycidyl ether, dipropylene glycol diglycidyl ether, polypropylene glycol diglycidyl ether, polybutadiene diglycidyl ether, butadiene diepoxide, vinylcyclohexene diepoxide, limonene diepoxide, the diepoxides of double unsaturated fatty acid C1-C18 alkyl esters, 2-dihydroxybenzene diglycidyl ether, 1,4-dihydroxybenzene diglycidyl ether, 4,4'-(3,3,5-trimethylcyclohexyliden)bisphenyl diglycidyl ether, diglycidyl isophthalate.

More preferred the polyfunctional alkylene oxide (F-2) is selected from the group consisting of resorcinol diglycidyl ether, bisphenol A diglycidyl ether, and bisphenol F diglycidyl ether.

Most preferred the polyfunctional alkylene oxide (F-2) is selected from the group consisting of bisphenol A diglycidyl ether, and bisphenol F diglycidyl ether.

In one embodiment of the method according to the invention, the compound (F-2) is present in an amount of ≥0.1 to ≤20.0 weight-%, preferably in an amount of ≥0.2 to ≤17.0 weight-%, more preferred ≥0.5 to ≤15.0 weight-%, based on the theoretical yield of the thermoplastic polyoxazolidinone (O).

Product-by-Process Claim

Another aspect of the present invention is a thermoplastic polyoxazolidinone (O), obtainable by a method according to the invention.

In an embodiment of the invention the theoretical number average molecular weights Mn of the thermoplastic polyoxazolidinone (O) is preferentially ≥500 to ≤500'000 g/mol, more preferred ≥1'000 to ≤50'000 g/mol and even more preferred ≥5'000 to ≤25'0000 g/mol as determined with gel permeation chromatography (GPC).

Preferably, the molar amount of mono-epoxide and mono-isocyanate compound added as compound (C) fulfils certain criteria with respect to the molar amount of bisepoxide compound (B) and diisocyanate compound (A). The ratio r is defined as the absolute value of the molar amount of compound (C) ($n_C$) to the difference between the molar amount of bisepoxide compound (B) ($n_{bisepoxide}$) and the molar amount of diisocyanate compound (A) ($n_{diisocyanate}$) according to the following formula (1)

$$r = |n_C/(n_{bisepoxide} - n_{diisocyanate})| \quad (1)$$

is preferably in the range of ≥1.5 to ≤2.5, more preferably in the range of ≥1.9 to ≤2.1, and particularly preferred in the range of ≥1.95 to ≤2.05. Without being bound to a theory, all epoxide groups and all isocyanate groups will have reacted at the end of the reaction, when such an amount of chain regulator is being used.

As an alternative, an excess of a mono-epoxide and/or a mono-isocyanate compound is added as chain regulator to the reaction mixture after the reaction between bisepoxide and diisocyanate has been completed. Without being bound to a theory, the terminal epoxide groups or the terminal isocyanate groups resulting from the reaction of the bisepoxide and the diisocyanate will be converted to inert end groups by reaction with the regulator. The excess amount of regulator is subsequently removed from the product, e.g., by extraction, precipitation, distillation, stripping or thin film evaporation.

In an embodiment of the method according to the invention the method further comprises the step of isolating the thermoplastic polyoxazolidinone obtained by the reaction, heating the thermoplastic polyoxazolidinone and pressing the thermoplastic polyoxazolidinone into a desired shape.

The present invention further relates to a spun fiber, comprising a thermoplastic polyoxazolidinone according to the invention and a textile, comprising such a spun fiber.

The method according to the invention is suited for the synthesis of oxazolidinones with interesting properties for use, for example, as pharmaceutics or antimicrobiotics.

Thermoplastic polyoxazolidinones obtained by the method according to the invention are particularly suited as polymer building blocks in polyurethane chemistry. For example, epoxy-terminated oligomeric oxazolidinones (oligooxazolidinones) may be reacted with polyols or polyamines to form foams or thermosets. Such epoxy-terminated oligomeric oxazolidinones are also suited for the preparation of composite materials. Epoxy-terminated oligomeric oxazolidinones (oligooxazolidinones) may also be reacted with their NCO-terminated counterparts to form high molecular weight thermoplastic polyoxazolidinones, which are useful as transparent, high temperature-stable materials. Thermoplastic polyoxazolidinones with high molecular weight obtained by the method according to the invention are particularly suited as transparent, high temperature-stable thermoplastic materials.

The conventional additives for these thermoplastics, such as fillers, UV stabilizers, heat stabilizers, antistatics and pigments, can also be added in the conventional amounts to the thermoplastic polyoxazolidinones according to the invention; the mould release properties, the flow properties and/or the flame resistance can optionally also be improved by addition of external mould release agents, flow agents and/or flameproofing agents (e.g. alkyl and aryl phosphites and phosphates, alkyl- and arylphosphanes and low molecular weight carboxylic acid alkyl and aryl esters, halogen compounds, salts, chalk, quartz flour, glass fibres and carbon fibres, pigments and a combination thereof. Such compounds are described e.g. in WO 99/55772, p. 15-25, and in the corresponding chapters of the "Plastics Additives Handbook", ed. Hans Zweifel, 5th edition 2000, Hanser Publishers, Munich).

The thermoplastic polyoxazolidinones obtained according to the current invention have excellent properties regarding stiffness, hardness and chemical resistance.

They are also useful in polymer blends with other polymers such as polystyrene, high-impact polystyrene (polystyrene modified by rubber for toughening, usually polybutadiene), copolymers of styrene such as styrene-acrylonitrile copolymer (SAN), copolymers of styrene, alpha-methylstyrene and acrylonitrile, styrene-methyl methacrylate copoylmers, styrene-maleic anhydride copolymers, styrene-maleimide copolymers, styrene-acrylic acid copolymers, SAN modified by grafting rubbers for toughening such as ABS (acrylonitrile-butadiene-styrene polymer), ASA (acrylonitrile-styrene-acrylate), AES (acrylonirile-EPDM-styrene), ACS (acrylonitrile-chlorinated polyethylene-stryrene) polymers, copolymers of styrene, alpha-methylstyrene and acrylonitrile modified with rubbers such as polybutadiene or EPDM, MBS/MABS (methyl methacrylate-styrene modified with rubber such as polybutadiene or EPDM), aromatic polyesters such as polyethylene terephthalate (PET), polybutylene terephthalate (PBT), polytrimethylene terephthalate (PTT), aliphatic polyamides such as PA6, PA6,6, PA4,6, PA 11 or PA 12, polylactic acid, aromatic polycarbonates such as the polycarbonate of bisphenol A, co-polycarbonates such as co-polycarbonates of bisphenol A and bisphenol TMC, polymethylmethacrylate (PMMA), polyvinylchloride, polymethyleneoxide (POM), polyphenylene ether, polyphenylene sulphide (PPS), polysulfones, polyetherimide (PEI), polyethylene, polypropylene.

They are also useful for blends in combination with the above polymers or others, for example blends of polycarbonate and ABS, polycarbonate and PET, polycarbonate and PBT, polycarbonate and ABS and PBT or polycarbonate and ABS and PBT.

The properties of the thermoplastic polyoxazolidinones according to this invention or blends with the above-mentioned polymers or others can also be modified by fillers such as glass fibers, hollow or solid glass spheres, silica (for example fumed or precipitated silica), talcum, calcium carbonate, titanium dioxide, carbon fibers, carbon black, natural fibers such as straw, flax, cotton or wood fibers.

Thermoplastic polyoxazolidinones can be mixed with any usual plastics additive such as antioxidants, light stabilizers, impact modifiers, acid scavengers, lubricants, processing aids, anti-blocking additives, slip additives, antifogging additives, antistatic additives, antimicrobials, chemical blowing agents, colorants, optical brighteners, fillers and reinforcements as well as flame retardant additives.

Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

A specific type of impact modifier is an elastomer-modified graft copolymer comprising (i) an elastomeric (i.e., rubbery) polymer substrate having a Tg less than 10° C., more specifically less than −10° C., or more specifically −40° to 80° C., and (ii) a rigid polymeric shell grafted to the elastomeric polymer substrate. Materials suitable for use as the elastomeric phase include, for example, conjugated diene rubbers, for example polybutadiene and polyisoprene; copolymers of a conjugated diene with less than 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric C1-8 alkyl (meth)acrylates; elastomeric copolymers of C1-8 alkyl (meth)acrylates with butadiene and/or styrene; or combinations comprising at least one of the foregoing elastomers. materials suitable for use as the rigid phase include, for example, monovinyl aromatic monomers such as styrene and alpha-methyl styrene, and monovinylic monomers such as acrylonitrile, acrylic acid, methacrylic acid, and the C1-C6 esters of acrylic acid and methacrylic acid, specifically methyl methacrylate.

Specific exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

Impact modifiers are generally present in amounts of 1 to 30 wt %, specifically 3 to 20 wt %, based on the total weight of the polymers in the flame retardant composition. An exemplary impact modifier comprises an acrylic polymer in an amount of 2 to 15 wt %, specifically 3 to 12 wt %, based on the total weight of the flame retardant composition.

The composition may also comprise mineral fillers. In an embodiment, the mineral fillers serve as synergists. The synergist facilitates an improvement in the flame retardant properties when added to the flame retardant composition over a comparative thermoplastic polyoxazolidinone composition that contains all of the same ingredients in the same quantities except for the synergist. Examples of mineral fillers are mica, talc, calcium carbonate, dolomite, wollastonite, barium sulfate, silica, kaolin, feldspar, barytes, or the like, or a combination comprising at least one of the foregoing mineral fillers. The mineral filler may have an average particle size of 0.1 to 20 micrometers, specifically 0.5 to 10 micrometers, and more specifically 1 to 3 micrometers. An exemplary mineral filler it talc having an average particle size of 1 to 3 micrometers.

The mineral filler is present in amounts of 0.1 to 20 wt %, specifically 0.5 to 15 wt %, and more specifically 1 to 5 wt %, based on the total weight of the flame retardant composition.

The thermoplastic polyoxazolidinones can also be colored with a whole range of soluble organic dyes and with pigment dyes, which can be either organic or inorganic.

Further possible uses of the thermoplastic polyoxazolidinones according to the invention are:
01. Housing for electrical appliances (e.g. household appliances, computers, mobile phones, display screens, television, . . . ), including transparent or translucent housing parts like lamp covers.
02. Light guide panels and BLUs
03. Optical Data Storage (CD, DVD, Blu-ray Discs)
04. electrically insulating materials for electrical conductors, for plug housings and plug connectors, carrier material for organic photoconductors, Chip boxes and chip supports, fuse encapsulation
05. Static dissipative/electrically conductive formulations for use in explosion protection applications and others with respective requirements
06. Optics, diffusers, reflectors, light guides as well as housings for LED and conventional Lighting, e.g. streetlights, industrial lamps, searchlights, traffic lights, . . . .
07. Thermally conductive formulations for thermal management applications like heatsinks.
08. Applications for Automotive and other Transportation vehicles (cars, buses, trucks, railway, aircrafts, ships) as Glazing, also safety glazing, lighting (e.g. headlamp lenses, tail lights, turn signals, back-up lights, fog lights; bezels and reflectors), sun and panoramic roofs, cockpit canopies, cladding of railway or other cabins, Windscreens, interiors and exteriors parts (e.g. instrument covers, consoles, dashboards, mirror housings, radiator grilles, bumpers, spoilers),
09. EVSE and batteries
10. Metal substitution in gears, seals, supporting rings
11. Roof structures (e.g. for sports arenas, stations, conservatories, greenhouses)
12. windows (including theft-proof windows and projectile-resistant windows, teller's windows, barriers in banks),
13. partition walls
14. solar panels
15. Medical devices (components of blood pumps, auto-injectors and mobile medical-injection pumps, IV access devices, renal therapy and inhalation devices (such as nebulizers, inhalers) sterilisable surgical instruments, medical implants, oxygenators, dialyzers, . . . )
16. Foodcontact applications (tableware, dinnerware, glasses, tumblers, food containers, institutional food trays, water bottles, water filter systems)
17. sports articles, such as e.g. slalom poles or ski boot buckles.
18. household articles, such as e.g. kitchen sinks and letter-box housings.
19. safety applications (glasses, visors or optical corrective glasses, helmets, visors, riot gear (helmets and shields), safety panes)
20. Sunglasses, swimming goggles, SCUBA masks
21. Signs, displays, poster protection
22. Lightweight luggage
23. water fitting, pump impellors, thin hollow fibres for water treatment
24. Industrial pumps, valves and seals, connectors
25. Membranes
26. Gas separation
27. Coating applications (e.g. Anticorrosion paint, powder coating)

In a first embodiment the invention is related to a process for producing thermoplastic polyoxazolidinonespolyoxazolidinone comprising copolymerization of a diisocyanate compound (A) with a bisepoxide compound (B) in the presence of a catalyst (C) and a compound (D) in a solvent (E), wherein the catalyst (C) is selected from the group consisting of alkali halogenides and earth alkali halogenides, and transition metal halogenides, compound (D) is selected from the group consisting of monofunctional isocyanate, monofunctional epoxide, and wherein the process comprises the following steps (α) placing the solvent (E) and the catalyst (C) in a reactor to provide a mixture, and (β) adding the diisocyanate compound (A), the bisepoxide compound (B) and the compound (D) to the mixture resulting from step (α).

In a second embodiment the invention is related to the process according to the first embodiment, wherein the diisocyanate compound (A), the bisepoxide compound (B) and the compound (D) of step (β) are added in a continuous manner to the mixture of step (α).

In a third embodiment the invention is related to the process according to the first embodiment, wherein the diisocyanate compound (A), the bisepoxide compound (B) and the compound (D) of step (β) are added in a step-wise manner to the mixture of step (α).

In a fourth embodiment the invention is related to the process according to the first embodiment, wherein the diisocyanate compound (A), the bisepoxide compound (B) and the compound (D) are mixed prior the addition to the mixture resulting from step (α).

In a fifth embodiment the invention is related to the process according to the fourth embodiment, wherein the mixture of the diisocyanate compound (A), the bisepoxide compound (B) and the compound (D) of step (β) are added in a continuous manner to the mixture of step (α).

In a sixth embodiment the invention is related to the process according to the fourth embodiment, wherein the mixture of the diisocyanate compound (A), the bisepoxide compound (B) and the compound (D) of step (β) are added in a step-wise manner with two or more individual addition steps to the mixture of step (α).

In a seventh embodiment the invention is related to the process according to any of the first to sixth embodiment, wherein the solvent (E) comprising a polar aprotic solvent (E-1).

In an eighth embodiment the invention is related to the process according to any of the first to seventh embodiment, wherein the diisocyanate compound (A) is at least one compound selected from the group consisting of tetramethylene diisocyanate, hexamethylene diisocyanate (HDI), 2-methylpentamethylene diisocyanate, 2,2,4-trimethyl-hexamethylene diisocyanate (THDI), dodecanemethylene diisocyanate, 1,4-diisocyanatocyclohexane, 3-isocyanatomethyl-3,3,5-trimethylcyclohexyl isocyanate (isophorone diisocyanate, IPDI), diisocyanatodicyclohexylmethane (H12-MDI), diphenylmethane diisocyanate (MDI), 4,4'-diisocyanato-3,3'-dimethyldicyclohexylmethane, 4,4'-diisocyanato-2,2-dicyclohexyl-propane, poly(hexamethylene diisocyanate), octamethylene diisocyanate, tolylene-α,4-diisocyanate, poly(propylene glycol) tolylene-2,4-diisocyanate terminated, poly(ethylene adipate) tolylene-2, 4-diisocyanate terminated, 2,4,6-trimethyl-1,3-phenylene diisocyanate, 4-chloro-6-methyl-1,3-phenylene diisocyanate, poly[1,4-phenylene diisocyanate-co-poly(1,4-butanediol)] diisocyanate, poly(tetrafluoroethylene oxide-co-difluoromethylene oxide) α,ω-diisocyanate, 1,4-diisocanatobutane, 1,8-diisocyanatooctane, 1,3-bis(1-isocyanato-1-methylethyl)benzene, 3,3'-dimethyl-4,4'-biphenylene diisocyanate, naphthalene-1,5-diisocyanate, 1,3-phenylene diisocyanate, 1,4-diisocyanatobenzene, 2,4- or 2,5- and 2,6-diisocyanatotoluene (TDI) or mixtures of these isomers, 4,4'-, 2,4'- or 2,2'-diisocyanatodiphenylmethane or mixtures of these isomers, 4,4'-, 2,4'- or 2,2'-diisocyanato-2,2-diphenylpropane-p-xylene diisocyanate and α,α,α',α'-tetramethyl-m- or -p-xylene diisocyanate (TMXDI) or biurets, isocyanurates or uretdiones of the aforementioned isocyanates.

In a ninth embodiment the invention is related to the process according to any of the first to eighth embodiment, wherein the bisepoxide compound (B) is at least one compound selected from the group consisting of resorcinol diglycidyl ether, neopentyl glycol diglycidyl ether, 1,6-hexanediol diglycidyl ether, 1,4-butandiol diglycidyl ether, hydrogenated bisphenol-A diglycidyl ether, bisphenol-A diglycidyl ether, bisphenol-F diglycidyl ether, bisphenol-S digylcidyl ether, 9,9-bis(4-glycidyloxy phenyl)fluorine, tetrabromo bisphenol-A diglycidyl ether, tetrachloro bisphenol-A diglycidyl ether, tetramethyl bisphenol-A diglycidyl ether, tetramethyl bisphenol-F diglycidyl ether, tetramethyl bisphenol-S diglycidyl ether, diglycidyl terephthalate, diglycidyl o-phthalate, 1,4-cyclohexane dicarboxylic acid diglycidyl ester, ethylene glycol diglycidyl ether, polyethylene glycol diglycidyl ether, diethylene glycol diglycidyl ether, propylene glycol diglycidyl ether, dipropylene glycol diglycidyl ether, polypropylene glycol diglycidyl ether, polybutadiene diglycidyl ether, butadiene diepoxide, vinylcyclohexene diepoxide, limonene diepoxide, the diepoxides of double unsaturated fatty acid C1-C18 alkyl esters, 2-dihydroxybenzene diglycidyl ether, 1,4-dihydroxybenzene diglycidyl ether, 4,4'-(3,3,5-trimethylcyclohexyliden)bisphenyl diglycidylether and diglycidyl isophthalate.

In a tenth embodiment the invention is related to the process according to any of the first to ninth embodiment, wherein the catalyst (C) is at least one compound is selected from the group consisting of LiCl, LiBr, LiI, MgCl$_2$, MgBr$_2$, MgI$_2$, SmI$_3$, preferred LiCl and LiBr, and most preferred LiCl.

In an eleventh embodiment the invention is related to the process according to any of the first to tenth embodiment, wherein the compound (D) is at least one compound is selected from the group consisting of phenyl glycidyl ether, o-kresyl glycidyl ether, m-kresyl glycidyl ether, p-kresyl glycidyl ether, 4-tert-butylphenyl glycidyl ether, 1-naphthyl glycidyl ether, 2-naphthyl glycidyl ether, 4-chlorophenyl glycidyl ether, 2,4,6-trichlorophenyl glycidyl ether, 2,4,6-tribromophenyl glycidyl ether, pentafluorophenyl glycidyl ether, cyclohexyl glycidyl ether, benzyl glycidyl ether, glycidyl benzoate, glycidyl acetate, glycidyl cyclohexylcarboxylate, methyl glycidyl ether, ethyl glycidyl ether, butyl glycidyl ether, hexyl glycidyl ether, 2-ethylhexyl glycidyl ether, octyl glycidylether, C10-C18 alkyl glycidyl ether, allyl glycidyl ether, ethylene oxide, propylene oxide, styrene oxide, 1,2-butene oxide, 2,3-butene oxide, 1,2-hexene oxide, oxides of C10-C18 alpha-olefines, cyclohexene oxide, vinylcyclohexene monoxide, limonene monoxide, butadiene monoepoxide and/or N-glycidyl phthalimide and/or n-hexylisocyanate, 4-tert-butylphenyl glycidyl ether, cyclohexyl isocyanate, ω-chlorohexamethylene isocyanate, 2-ethyl hexyl isocyanate, n-octyl isocyanate, dodecyl isocyanate, stearyl isocyanate, methyl isocyanate, ethyl isocyanate, butyl isocyanate, isopropyl isocyanate, octadecyl isocyanate, 6-chloro-hexyl isocyanate, cyclohexyl isocyanate, 2,3, 4-trimethylcyclohexyl isocyanate, 3,3,5-trimethylcyclohexyl isocyanate, 2-norbornyl methyl isocyanate, decyl isocyanate, dodecyl isocyanate, tetradecyl isocyanate, hexadecyl isocyanate, octadecyl isocyanate, 3-butoxypropyl isocyanate, 3-(2-ethylhexyloxy)-propyl isocyanate, (trimethylsilyl)isocyanate, phenyl isocyanate, ortho-, meta-, para-tolyl isocyanate, chlorophenyl isocyanate (2,3,4-isomers), dichlorophenyl isocyanate, 4-nitrophenyl isocyanate, 3-trifluoromethylphenyl isocyanate, benzyl isocyanate, dimethylphenylisocyanate (technical mixture and individual isomers), 4-dodecylphenylisocyanat, 4-cyclohexyl-phenyl isocyanate, 4-pentyl-phenyl isocyanate, 4-t-butyl phenyl isocyanate, 1-naphthyl isocyanate.

In a twelfth embodiment the invention is related to the process according to any of the seventh to eleventh embodiment, wherein the polar aprotic solvent (E-1) is selected from the group consisting of sulfolane, dimethylsulfoxide, and gamma-butyrolactone.

In a thirteenth embodiment the invention is related to a process for the production of thermoplastic polyoxazolidinones (O), wherein the thermoplastic polyoxazolidinone according to any one of the first to twelfth embodiment is further reacted with at least one compound (F), wherein the compound (F) is an alkylene oxide.

In a fourteenth embodiment the invention is related to the process according to the thirteenth embodiment, wherein the compound (F) is a monofunctional alkylene oxide (F-1) and/or polyfunctional alkylene oxide (F-2)

In a fifteenth embodiment the invention is related to the process according to the fourteenth embodiment, wherein the monofunctional alkylene oxide (F-1) is at least one compound selected from the group consisting of phenyl glycidyl ether, o-kresyl glycidyl ether, m-kresyl glycidyl ether, p-kresyl glycidyl ether, 4-tert-butylphenyl glycidyl ether, 1-naphthyl glycidyl ether, 2-naphthyl glycidyl ether, 4-chlorophenyl glycidyl ether, 2,4,6-trichlorophenyl glycidyl ether, 2,4,6-tribromophenyl glycidyl ether, pentafluorophenyl glycidyl ether, cyclohexyl glycidyl ether, benzyl glycidyl ether, glycidyl benzoate, glycidyl acetate, glycidyl cyclohexylcarboxylate, methyl glycidyl ether, ethyl glycidyl ether, butyl glycidyl ether, hexyl glycidyl ether, 2-ethylhexyl glycidyl ether, octyl glycidylether, C10-C18 alkyl glycidyl ether, allyl glycidyl ether, ethylene oxide, propylene oxide, styrene oxide, 1,2-butene oxide, 2,3-butene oxide, 1,2-hexene oxide, oxides of C10-C18 alpha-olefines, cyclohexene oxide, vinylcyclohexene monoxide, limonene monoxide, butadiene monoepoxide N-glycidyl phthalimide, and 4-tert-butylphenyl glycidyl ether.

In a sixteenth embodiment the invention is related to the process according to the fourteenth or fifteenth embodiment, wherein the polyfunctional alkylene oxide (F-2) is at least one compound selected from the group consisting of resorcinol diglycidyl ether, neopentyl glycol diglycidyl ether, 1,6-hexanediol diglycidyl ether, 1,4-butandiol diglycidyl ether, hydrogenated bisphenol-A diglycidyl ether, bisphenol-A diglycidyl ether, bisphenol-F diglycidyl ether, bisphenol-S digylcidyl ether, 9,9-bis(4-glycidyloxy phenyl)fluorine, tetrabromo bisphenol-A diglycidyl ether, tetrachloro bisphenol-A diglycidyl ether, tetramethyl bisphenol-A diglycidyl ether, tetramethyl bisphenol-F diglycidyl ether, tetramethyl bisphenol-S diglycidyl ether, diglycidyl terephthalate, diglycidyl o-phthalate, 1,4-cyclohexane dicarboxylic acid diglycidyl ester, ethylene glycol diglycidyl ether, polyethylene glycol diglycidyl ether, diethylene glycol diglycidyl ether, propylene glycol diglycidyl ether, dipropylene glycol diglycidyl ether, polypropylene glycol diglycidyl ether, polybutadiene diglycidyl ether, butadiene diepoxide, vinylcyclohexene diepoxide, limonene diepoxide, the diepoxides of double unsaturated fatty acid C1-C18 alkyl esters, 2-dihydroxybenzene diglycidyl ether, 1,4-dihydroxybenzene diglycidyl ether, 4,4'-(3,3,5-trimethylcyclohexyliden)bisphenyl diglycidylether diglycidyl isophthalate.

In a seventeenth embodiment the invention is related to the thermoplastic polyoxazolidinone compound (O), obtainable by a process according to any one of the thirteenth to sixteenth embodiment.

In an eighteenth embodiment the invention is related to the thermoplastic polyoxazolidinone according to the seventeenth embodiment with a number average molecular weight $M_n$ from ≥500 to ≤500'000 g/mol, more preferred ≥1'000 to ≤50'000 g/mol and even more preferred ≥5'000 to ≤25'0000 g/mol as determined with gel permeation chromatography (GPC).

In a nineteenth embodiment the invention is related to the process according to any of the first fifteenth embodiment, wherein step (α) is performed at reaction temperatures of ≥130° C. to ≤280° C., preferably at a temperature of ≥140° C. to ≤240° C., more preferred at a temperature of ≥155° C. to ≤210° C.

In a twentieth embodiment the invention is related to the process according to any of the first to fifteenth or nineteenth embodiment, wherein step (α) is performed at reaction times of 1 h to 20 h, preferably at 1 h to 10 h and more preferably at 1 h to 6 h.

In a twenty-first embodiment the invention is related to the process according to any of the first to fifteenth and nineteenth to twentieth embodiment, wherein step (β) is performed at reaction temperatures of ≥130° C. to ≤280° C., preferably at a temperature of ≥140° C. to ≤240° C., more preferred at a temperature of ≥155° C. to ≤210° C.

In a twenty second embodiment the invention is related to the process according to any of the first to fifteenth and nineteenth to twenty-first embodiment, wherein step (β) is performed at reaction times of 1 h to 20 h, preferably at 1 h to 10 h and more preferably at 1 h to 6 h.

In a twenty third embodiment the invention is related to the process according to any of the first to fifteenth and nineteenth to twenty second embodiment, wherein the compound (F) is present in an amount of ≥0.1 to ≤7.0 weight-%, preferably in an amount of ≥0.2 to ≤5.0 weight-%, more preferred ≥0.5 to ≤3.0 weight-%, based on the theoretical yield of thermoplastic polyoxazolidinone (O) after step (α).

EXAMPLES

The present invention will be further described with reference to the following examples without wishing to be limited by them.

Diisocyanate Compound (A)
A-1: Methylene diphenyl diisocyanate (MDI), 98%, Covestro AG, Germany
A-2: 2,4-Toluenediisoyanate >99% (TDI) 2,4-Isomer, Covestro AG, Germany Epoxide Compound (B)
B-1 BADGE 2-[[4-[2-[4-(Oxiran-2-ylmethoxy)phenyl]propan-2-yl]phenoxy]methyl]oxirane (Bisphenol-A-diglycidylether), difunctional epoxide, Epikote 162 (Hexion, 98%) was used as obtained without further purification.

Catalyst (C)
C-1: LiCl Lithium chloride, purity >99%, was obtained from Sigma Aldrich
C-2: LiBr Lithium bromide, purity >99,995%, was obtained from Sigma Aldrich
C-3: Ph3P(PhOMe)Br triphenyl-o-methoxyphenyl phosphonium bromide was synthesized and purified as described in the literature (Adv. Synth. Catal. 2008, 350, 2967-2974)

Solvents (E)
Ortho-dichlorobenzene (o-DCB), purity 99%, anhydrous, was obtained from Sigma-Aldrich, Germany
N-Methylpyrrolidone (NMP), purity 99.5%, anhydrous, was obtained from Sigma-Aldrich, Germany Sulphur Containing Solvent (E-1)
Sulfolane, purity ≥99%, anhydrous, was obtained from Sigma-Aldrich, Germany Compound (D) and (F)
BPGE para-tert.-butylphenylglycidylether (94%, Denacol EX-146, Nagase Chem Tex Corporation, Japan)
PTI p-tolylisocyanate: purity 99%, anhydrous, was obtained from Sigma-Aldrich, Germany TDI, MDI, LiCl, LiBr were used as received without further purification. BADGE (Epikote 162) and sulfolane was used after melting at 50° C. and drying over molecular sieves. o-DCB and NMP were dried over molecular sieves prior to use. BPGE and PTI were distilled prior to use Addition protocol 1: Solution of diisocyanate compound (A) is added to a solution of bisepoxide compound (B) the catalyst (C) and the compound (D).

Addition protocol 2: The diisocyanate compound (A), the bisepoxide compound (B) and the compound (D) is added to the reactor containing the catalyst (C) dissolved in the solvent (E) comprising the solvent (E-1) according to claim 1 of the present application.

Characterisation of Polyoxazolidinone
IR
Solid state IR analyses were performed on a Bruker ALPHA-P IR spectrometer equipped with a diamond probe head. The software OPUS 6.5 was used for data treatment. A background spectrum was recorded against ambient air. Thereafter, a small sample of the polyoxazolidinone (2 mg) was applied to the diamond probe and the IR spectrum recorded averaging over 24 spectra obtained in the range of 4000 to 400 cm$^{-1}$ with a resolution of 4 cm$^{-1}$.

NMR
For $^1$H NMR analysis, a sample of the oligomer (20 mg) was dissolved in deuterated dimethyl sulfoxide (0.5 mL) and measured on a Bruker spectrometer (AV400, 400 MHz).

Molecular Weight
The average chain length of the thermoplastic polyoxazolidinones was controlled by the molar ratio of diepoxide, diisocyanate and/or compound (D).

The formula below gives a general mathematical formula to calculate the average chain length n in the polymeric product obtained with a diisocyanate (A) and a bisepoxide (B):

$$n=(1+q)/(1+q-2pq) \qquad (2)$$

with $q=n_x/n_y \leq 1$ and x,y=bisepoxide (B) or diisocyanate (A)
and with the conversion p
whereby $n_x$ and $n_y$ are the molar amounts of bisepoxide or diisocyanate, respectively.

DSC
The glass transition point $T_g$ was recorded on a Mettler Toledo DSC 1. The sample (4 to 10 mg) was heated from 25° C. to 250° C. at a heating rate of 10 K/min then cooled down to 30° C. at a rate of 10 K/min. This heating cycle was repeated four times. For data analysis the software STAR SW 11.00 was used. For determination of the glass transition temperature a tangential analysis method was used. The midpoint of the intersection point between the tangent at low temperature and the tangent in the mid temperature range and the intersection point between the tangent in the mid temperature range and the tangent at high temperature is stated. The reported $T_g$ was taken from the third heating cycle.

TGA

The stability of the thermoplastic polyoxazolidinones was characterized by thermogravimetric analysis (TGA). The measurements were performed on a Mettler Toledo TGA/DSC 1. For data analysis the software STAR$^e$ SW 11.00 was used. The sample (6 to 20 mg) was weighed in a 70 μL Alox pan (previously cleaned at 1000° C. for 7 hrs), heated from 25° C. to 600° C. with a heating rate of 10 K/min under argon flow (35 mL/min) and the relative weight loss was followed in dependence of temperature. For data analysis the software STAR$^e$ SW 11.00 was used. The decomposition temperature ($T_d$) stated is the onset point determined from the step tangent of the sinusoidal weight loss curve. To study the thermal stability over time, the thermoplastic polyoxazolidinones samples (6 to 20 mg) were weighed in a 70 μL Alox pan (previously cleaned at 1000° C. for 7 hrs), heated from 25° C. to the target temperature (240° C. and 260° C. respectively) with a heating rate of 10 K/min under argon flow (35 mL/min) followed by an isothermal heating for 1 h at the corresponding target temperature. The relative weight loss was followed in dependence of time. The $\Delta wt \%^T$ given in the examples is the weight loss percentage of the sample after 1 h at the target temperature T.

GPC

GPC measurements were performed at 40° C. in N,N-dimethylacetamide (DMAc, flow rate of 0.675 mL min$^{-1}$). The column set consisted of 4 consecutive columns (GRAM precolumn, GRAM 3000, GRAM 3000, GRAM 100). Samples (concentration 2-3 g L$^{-1}$, injection volume 20 μL) were injected employing an Agilent technologies 1260 Infinity auto sampler. An RID detector was used to follow the concentration at the exit of the column. Raw data were processed using the PSS WinGPC Unity software package. Polystyrene of known molecular weight was used as reference to calculate the molecular weight distribution. The number average molecular weight measured by GPC is denominated as $M_n$(GPC) in the examples.

Reactor

The 300 ml stainless steel PARR reactor used in the examples had a height (internal) of 10.16 cm and an internal diameter of 6.35 cm. The reactor was fitted with an electric heating jacket (510 watt maximum heating capacity). The reactor is equipped with a counter cooling consisted of a U-shaped dip tube of external diameter 6 mm which projected into the reactor to within 5 mm of the bottom. The reactor was also fitted with an inlet tube and a temperature probe of diameter 1.6 mm, both of which projected into the reactor to within 3 mm of the bottom. A machined spiral stirrer from PARR was used in the examples. An HPLC pump (KNAUER smartline pump 100 with pressure sensor) was connected to the reactor to add solution during the reaction.

Example 1: Polymerization of TDI as Compound (A) and BADGE as Compound (B) with BPGE as Compound (D) Using LiBr as Compound (C) with Addition Protocol 2 and Sulfolane as Solvent (E-1)

A reactor as previously described was charged with LiBr (0.16 g, 1.84 mmol). Then sulfolane (15 mL) and oDCB (40 mL) was added. The reactor was closed and inertised with argon. The mixture was stirred (400 rpm) and heated to 175° C. After 10 min at this temperature, a solution of TDI (16.00 g, 91.87 mmol), BADGE (30.66 g, 90.06 mmol) and BPGE (0,754 g, 3.62 mmol) in oDCB (45 mL) was added at a rate of 1 mL/min. After 210 min, 55 mL of NMP were added. After another 15 min, the reaction mixture was allowed to cool to room temperature.

The completion of the reaction was confirmed by the absence of the isocyanate band (2260 cm$^{-1}$) in the IR spectrum from the reaction mixture.

The thermoplastic polyoxazolidinone was precipitated in methanol, milled with an ultraturrax dispersing instrument and collected by filtration. The thermoplastic polyoxazolidinone was twice resuspended in methanol, stirred 24 h and filtered. The thermoplastic polyoxazolidinone was then dried under vacuum at 150° C. for 6 h and analysed.

In the solid state IR spectrum the characteristic signal for the oxazolidinone carbonyl group was observed at 1749 cm$^{-1}$.

In the solid state IR spectrum the characteristic signal for isocyanurate groups was not observed.

In the $^1$H NMR spectrum, the characteristic methine and methylene signals assigned to the oxazolidinone moieties were observed.

Thermogravimetric analysis of the product showed a mass loss of 0.24 wt % after tempering at 240° C. for 1 h and a mass loss of 0.52 wt % after tempering at 260° C. for 1 h.

Example 2: Polymerization of TDI as Compound (A) and BADGE as Compound (B) with BPGE as (D) Using LiCl as Compound (C) with Addition Protocol 2 and Sulfolane as Solvent (E-1)

A reactor as previously described was charged with LiCl (0.08 g, 1.84 mmol). Then sulfolane (15 mL) and oDCB (40 mL) were added. The reactor was closed and inertised with argon. The mixture was stirred (400 rpm) and heated to 175° C. After 10 min at this temperature, a solution of TDI (16.00 g, 91.87 mmol), BADGE (30.66 g, 90.06 mmol) and BPGE (0.75 g, 3.62 mmol) in oDCB (45 mL) was added at a rate of 1 mL/min. After 210 min, 55 mL of NMP were added. After another 15 min, the reaction mixture was allowed to cool to room temperature.

The completion of the reaction was confirmed by the absence of the isocyanate band (2260 cm$^{-1}$) in the IR spectrum from the reaction mixture. The thermoplastic polyoxazolidinone was precipitated in methanol, milled with an ultraturrax dispersing instrument and collected by filtration. The thermoplastic polyoxazolidinone was twice resuspended in methanol, stirred 24 h and filtered. The thermoplastic polyoxazolidinone was then dried under vacuum at 150° C. for 6 h and analysed.

In the solid state IR spectrum the characteristic signal for the oxazolidinone carbonyl group was observed at 1747 cm$^{-1}$.

In the solid state IR spectrum the characteristic signal for isocyanurate groups at 1710 cm$^{-1}$ was not observed.

In the $^1$H NMR spectrum, the characteristic methine and methylene signals assigned to the oxazolidinone moieties were observed.

Thermogravimetric analysis of the product showed a mass loss of 0.32 wt % after tempering at 240° C. for 1 h and a mass loss of 0.37 wt % after tempering at 260° C. for 1 h.

Example 3: Polymerization of TDI as Compound (A) and BADGE as (B) with BPGE as Compound (D) Using LiCl as Compound (C) with Addition Protocol 2 without Sulfolane as Solvent (E-1)

A reactor as previously described was charged with LiCl (0.08 g, 1.84 mmol). Then oDCB (55 mL) was added. The reactor was closed and inertised with argon. The mixture was stirred (400 rpm) and heated to 175° C. After 10 min at this temperature, a solution of TDI (16.00 g, 91.87 mmol), BADGE (30.66 g, 90.06 mmol) and BPGE (0.75 g, 3.62 mmol) in oDCB (45 mL) was added at a rate of 1 mL/min. After 210 min, 55 mL of NMP were added. After another 15 min, the reaction mixture was allowed to cool to room temperature.

The completion of the reaction was confirmed by the absence of the isocyanate band (2260 cm$^{-1}$) in the IR spectrum from the reaction mixture. The thermoplastic polyoxazolidinone was precipitated in methanol, milled with an ultraturrax dispersing instrument and collected by filtration. The thermoplastic polyoxazolidinone was twice resuspended in methanol, stirred 24 h and filtered. The thermoplastic polyoxazolidinone was then dried under vacuum at 150° C. for 6 h and analysed.

In the solid state IR spectrum the characteristic signal for the oxazolidinone carbonyl group was observed at 1747 cm$^{-1}$.

In the solid state IR spectrum the characteristic signal for isocyanurate groups at 1710 cm$^{-1}$ was observed.

In the $^1$H NMR spectrum, the characteristic methine and methylene signals assigned to the oxazolidinone moieties were observed.

Example 4: Polymerization of TDI as Compound (A) and BADGE as Compound (B) with BPGE as (Compound (D) Using LiBr as Compound (C) with Addition Protocol 1 with Sulfolane as Solvent (E-1)

A reactor as previously described was charged with LiBr (0.16 g, 1.84 mmol), BADGE (30.66 g, 90.06 mmol) and BPGE (0.75 g, 3.62 mmol). Then sulfolane (10 mL) and oDCB (25 mL) were added. The reactor was closed and inertised with argon. The mixture was stirred (400 rpm) and heated to 175° C. After 10 min at this temperature, a solution of TDI (16 g, 91.87 mmol) in oDCB (50 mL) was added at a rate of 1 mL/min. After 120 min, the stirring stopped due to gelification in the reactor.

Analysis of the reaction mixture by IR spectroscopy showed uncomplete conversion of the isocyanate groups (2260 cm$^{-1}$).

The polymer was precipitated in methanol, milled with an ultraturrax dispersing instrument and collected by filtration. The polymer was twice resuspended in methanol, stirred 24 h and filtered.

The polymer was then dried under vacuum at 150° C. for 6 h and analysed.

In the solid state IR spectrum the characteristic signal for the oxazolidinone carbonyl group at 1749 cm$^{-1}$ was not observed.

In the solid state IR spectrum the characteristic signal for isocyanurate groups at 1710 cm$^{-1}$ was observed.

The polymer obtained was not soluble in NMR solvent.

Example 5 (Comparison): Polymerization of TDI as Compound (A) and BADGE as Compound (B) with BPGE as Compound (d) Using Ph$_3$P(PhOMe)Br as Compound (c) with Addition Protocol 2 with Sulfolane as Solvent (E-1)

A reactor as previously described was charged with Ph$_3$P(PhOMe)Br (0.83 g, 1.84 mmol). Then sulfolane (15 mL) and oDCB (40 mL) was added. The reactor was closed and inertised with argon. The mixture was stirred (400 rpm) and heated to 175° C. After 10 min at this temperature, a solution of TDI (16.00 g, 91.87 mmol), BADGE (30.66 g, 90.06 mmol) and BPGE (0,754 g, 3.62 mmol) in oDCB (45 mL) was added at a rate of 1 m/min. After 210 min, 55 mL of NMP were added. After another 15 min, the reaction mixture was allowed to cool to room temperature.

The completion of the reaction was confirmed by the absence of the isocyanate band (2260 cm$^{-1}$) in the IR spectrum from the reaction mixture. The thermoplastic polyoxazolidinone was precipitated in methanol, milled with an ultraturrax dispersing instrument and collected by filtration. The thermoplastic polyoxazolidinone was twice resuspended in methanol, stirred 24 h and filtered. The thermoplastic polyoxazolidinone was then dried under vacuum at 150° C. for 6 h and analysed.

In the solid state IR spectrum the characteristic signal for the oxazolidinone carbonyl group was observed at 1749 cm$^{-1}$.

In the solid state IR spectrum the characteristic signal for isocyanurate groups at 1710 cm$^{-1}$ was not observed.

In the $^1$H NMR spectrum, the characteristic methine and methylene signals assigned to the oxazolidinone moieties were observed.

Thermogravimetric analysis of the product showed a mass loss of 0.56 wt % after tempering at 240° C. for 1 h and a mass loss of 0.82 wt % after tempering at 260° C. for 1 h.

Example 6 (Comparison): Polymerization of TDI as Compound (A) and BADGE as Compound (B) with BPGE as Compound (D) Using Ph$_3$P(PhOMe)Br as Compound (C) with Addition Protocol 2 without Sulfolane as Solvent (E-1)

A reactor as previously described was charged with Ph$_3$P(PhOMe)Br (0.83 g, 1.84 mmol). Then oDCB (55 mL) was added. The reactor was closed and inertised with argon. The mixture was stirred (400 rpm) and heated to 175° C. After 10 min at this temperature, a solution of TDI (16.00 g, 91.87 mmol), BADGE (30.66 g, 90.06 mmol) and BPGE (0.75 g, 3.62 mmol) in oDCB (45 mL) was added at a rate of 1 mL/min. After 210 min, 55 mL of NMP were added. After another 15 min, the reaction mixture was allowed to cool to room temperature.

The completion of the reaction was confirmed by the absence of the isocyanate band (2260 cm$^{-1}$) in the IR spectrum from the reaction mixture. The thermoplastic polyoxazolidinone was precipitated in methanol, milled with an ultraturrax dispersing instrument and collected by filtration. The thermoplastic polyoxazolidinone was twice resuspended in methanol, stirred 24 h and filtered. The thermoplastic polyoxazolidinone was then dried under vacuum at 150° C. for 6 h and analysed.

In the solid state IR spectrum the characteristic signal for the oxazolidinone carbonyl group was observed at 1749 cm$^{-1}$.

In the solid state IR spectrum the characteristic signal for isocyanurate groups at 1710 cm$^{-1}$ was not observed.

In the ¹H NMR spectrum, the characteristic methine and methylene signals assigned to the oxazolidinone moieties were observed.

Thermogravimetric analysis of the product showed a mass loss of 0.41 wt % after tempering at 240° C. for 1 h and a mass loss of 0.76 wt % after tempering at 260° C. for 1 h.

Example 7 (Comparison): Polymerization of TDI as Compound (A) and BADGE as Compound (B) with BPGE as Compound (D) Using Ph₃P(PhOMe)Br as Compound (C) with Addition Protocol 1 without Sulfolane as Solvent (E-1)

A reactor as previously described was charged with Ph₃P(PhOMe)Br (0.83 g, 1.84 mmol), BADGE (30.66 g, 90.06 mmol) and BPGE (0.75 g, 3.62 mmol). Then oDCB (25 mL) were added. The reactor was closed and inertised with argon. The mixture was stirred (400 rpm) and heated to 175° C. After 10 min at this temperature, a solution of TDI (16 g, 91.87 mmol) in oDCB (70 mL) was added at a rate of 1 mL/min. After 420 min, 50 mL of NMP were added. After another 15 min, the reaction mixture was allowed to cool to room temperature.

The completion of the reaction was confirmed by the absence of the isocyanate band (2260 cm⁻¹) in the IR spectrum from the reaction mixture. The thermoplastic polyoxazolidinone was precipitated in methanol, milled with an ultraturrax dispersing instrument and collected by filtration. The thermoplastic polyoxazolidinone was twice resuspended in methanol, stirred 24 h and filtered. The thermoplastic polyoxazolidinone was then dried under vacuum at 150° C. for 6 h and analysed.

In the solid state IR spectrum the characteristic signal for the oxazolidinone carbonyl group was observed at 1747 cm⁻¹.

In the solid state IR spectrum the characteristic signal for isocyanurate groups at 1710 cm⁻¹ was observed.

In the ¹H NMR spectrum, the characteristic methine and methylene signals assigned to the oxazolidinone moieties were observed.

Thermogravimetric analysis of the product showed a mass loss of 1.40 wt % after tempering at 240° C. for 1 h and a mass loss of 1.86 wt % after tempering at 260° C. for 1 h.

Example 8 (Comparison): Polymerization of TDI as Compound (A) and BADGE as Compound (B) without Compound (D) Using LiCl as Compound (C) with Addition Protocol 2 with Sulfolane as Solvent (E-1)

A reactor as previously described was charged with LiCl (0.08 g, 1.84 mmol). Then sulfolane (15 mL) and oDCB (40 mL) were added. The reactor was closed and inertised with argon. The mixture was stirred (400 rpm) and heated to 175° C. After 10 min at this temperature, a solution of TDI (16.00 g, 91.87 mmol) and BADGE (30.66 g, 90.06 mmol) in oDCB (45 mL) was added at a rate of 1 mL/min. After 210 min, 55 mL of NMP were added. After another 15 min, the reaction mixture was allowed to cool to room temperature.

The completion of the reaction was confirmed by the absence of the isocyanate band (2260 cm⁻¹) in the IR spectrum from the reaction mixture. The thermoplastic polyoxazolidinone was precipitated in methanol, milled with an ultraturrax dispersing instrument and collected by filtration. The thermoplastic polyoxazolidinone was twice resuspended in methanol, stirred 24 h and filtered. The thermoplastic polyoxazolidinone was then dried under vacuum at 150° C. for 6 h and analysed.

In the solid state IR spectrum the characteristic signal for the oxazolidinone carbonyl group was observed at 1747 cm⁻¹.

In the solid state IR spectrum the characteristic signal for isocyanurate groups at 1710 cm⁻¹ was not observed.

In the ¹H NMR spectrum, the characteristic methine and methylene signals assigned to the oxazolidinone moieties were observed.

Thermogravimetric analysis of the product showed a mass loss of 0.71 wt % after tempering at 240° C. for 1 h and a mass loss of 0.74 wt % after tempering at 260° C. for 1 h.

Example 9: Polymerization of TDI as Compound (A) and BADGE as Compound (B) with p-Tolyl Isocyanate as Compound (D) Using LiCl as Compound (C) with Addition Protocol 2 and Sulfolane as Solvent (E-1)

A reactor as previously described was charged with LiCl (0.08 g, 1.84 mmol). Then sulfolane (15 mL) and oDCB (40 mL) were added. The reactor was closed and inertised with argon. The mixture was stirred (400 rpm) and heated to 175° C. After 10 min at this temperature, a solution of TDI (15.69 g, 90.06 mmol), BADGE (31.28 g, 91.87 mmol) and PTI (0.48 g, 3.62 mmol) in oDCB (45 mL) was added at a rate of 1 mL/min. After 210 min, 55 mL of NMP were added. After another 15 min, the reaction mixture was allowed to cool to room temperature.

The completion of the reaction was confirmed by the absence of the isocyanate band (2260 cm⁻¹) in the IR spectrum from the reaction mixture. The thermoplastic polyoxazolidinone was precipitated in methanol, milled with an ultraturrax dispersing instrument and collected by filtration. The thermoplastic polyoxazolidinone was twice resuspended in methanol, stirred 24 h and filtered. The thermoplastic polyoxazolidinone was then dried under vacuum at 150° C. for 6 h and analysed.

In the solid state IR spectrum the characteristic signal for the oxazolidinone carbonyl group was observed at 1747 cm⁻¹.

In the solid state IR spectrum the characteristic signal for isocyanurate groups at 1710 cm⁻¹ was not observed.

In the ¹H NMR spectrum, the characteristic methine and methylene signals assigned to the oxazolidinone moieties were observed.

Thermogravimetric analysis of the product showed a mass loss of 0.35 wt % after tempering at 240° C. for 1 h and a mass loss of 0.63 wt % after tempering at 260° C. for 1 h.

Example 10: Polymerization of MDI as Compound (A) and BADGE as Compound (B) Using a Low Monomer Concentration and LiCl as Catalyst (C) and Para-Tert-Butylphenyl Glycidyl Ether as Compound (D) and Addition of a Compound (F) Added in a Second Step with Addition Protocol 2 and Sulfolane as Solvent (E-1)

Under a continuous flow of nitrogen, a glass flask (500 mL) was charged with LiCl (0.0999 g) and sulfolane (28 mL) and stirred at 175° C. for 15 min. Subsequently, ortho-dichlorobenzene (95 mL) was added. A glass flask (200 mL) was charged with methylene diphenyl diisocyanate (29.4920 g), para-tert-butylphenyl glycidyl ether (0.9724 g), bisphenol A glycidyl ether (39.3150 g), and 85 mL ortho-dichlorobenzene. The monomer solution was added slowly to the catalyst solution within 90 min. After the addition was finished, the reaction was stirred at 175° C. for another 30 min. After a total reaction time of 120 min, para-tert-butylphenyl glycidyl ether (4.862 g), dissolved in ortho-dichlorobenzene (10 mL), was added to the reaction solution. After the addition, the reaction was stirred at 175° C. for another 60 min. The completion of the reaction was confirmed by the absence of the isocyanate band (2260 cm$^{-1}$) in the IR spectrum. Subsequently, 112 mL of N-methyl pyrrolidone were added to the reaction solution and the mixture was cooled to ambient temperature. The precipitation of the polymer was performed in ethanol at ambient temperature: The solution (50 mL) was added slowly into 400 mL of ethanol and milled with an ultraturrax dispersing instrument. The product was washed with ethanol, filtered, and dried at ambient temperature overnight. Subsequently, the product was dried under vacuum at 200° C. for 6 h.

Thermogravimetric analysis of the product (tempering at 260° C. for 1 h and at 280° C. for 1 h) showed mass loss of 0.11 wt. % and 0.16 wt. %, respectively.

In the solid state IR spectrum the characteristic signal for the oxazolidinone carbonyl group was observed at 1750 cm$^{-1}$.

Comparison the process comprises:
(a) placing the polar aprotic solvent and the catalyst in a reactor to provide a mixture,
(b) adding the diisocyanate compound, the bisepoxide compound and the chain regulator to the mixture resulting from step (a) to form a thermoplastic polyoxazolidinone, and
(c) reacting the thermoplastic polyoxazolidinone with an alkylene oxide,
wherein a calculated weight ratio of the sum of the weight of diisocyanate compound, bisepoxide compound, and chain regulator used to the sum of the weight of diisocyanate compound, bisepoxide compound, chain regulator, and polar aprotic solvent used in step (a) is from 5 wt % to 26 wt %.

2. The process according to claim 1, wherein, in step (b), the the diisocyanate compound, the bisepoxide compound, and the chain regulator are added in a continuous manner to the mixture resulting from step (a).

3. The process according to claim 1, wherein, in step (b), the the diisocyanate compound, the bisepoxide compound, and the chain regulator are added in a step-wise manner to the mixture resulting from step (a).

4. The process according to claim 1, wherein the catalyst comprises LiCl, LiBr, LiI, MgCl$_2$, MgBr$_2$, MgI$_2$, SmI$_3$, or a combination of two or more thereof.

TABLE 1

Comparison of the results of Examples to 10.

| Example | Compound (A) | Compound (C) | Compound (D) | Compound (F) | Addition Protocol | Solvent (E-1) | X(A) | Mn [g/mol] | PDI | $T_G$ [° C.] | $T_D$ [° C.] | Δwt %$^{240}$ | Δwt %$^{260}$ |
|---|---|---|---|---|---|---|---|---|---|---|---|---|---|
| 1 | TDI | LiBr | BPGE | — | 2 | Sulfolane | Complete | 14284 | 2.4 | 183.2 | 400.9 | 0.24 | 0.52 |
| 2 | TDI | LiCl | BPGE | — | 2 | Sulfolane | Complete | 12618 | 3.9 | 180.7 | 390.1 | 0.32 | 0.37 |
| 3 (comp.) | TDI | LiCl | BPGE | — | 2 | — | Complete | 6222 | 2.7 | 183.2 | 272.0 | 1.50 | 1.53 |
| 4 (comp.) | TDI | LiBr | BPGE | — | 1 | Sulfolane | Incomplete | n.s. | n.s. | 161.6 | 252.3 | n.d. | n.d. |
| 5 (comp.) | TDI | Ph$_3$P(PhOMe)Br | BPGE | — | 2 | Sulfolane | Complete | 9055 | 3.2 | 188.2 | 390.2 | 0.56 | 0.82 |
| 6 (comp.) | TDI | Ph$_3$P(PhOMe)Br | BPGE | — | 2 | — | Complete | 9830 | 4.7 | 185.1 | 384.2 | 0.41 | 0.76 |
| 7 (comp.) | TDI | Ph$_3$P(PhOMe)Br | BPGE | — | 1 | — | Complete | 7902 | 4.7 | 170.7 | 395.3 | 1.40 | 1.86 |
| 8 (comp.) | TDI | LiCl | — | — | 2 | Sulfolane | Complete | 12906 | 13.1 | 194.9 | 390.6 | 0.71 | 0.74 |
| 9 | TDI | LiCl | PTI | — | 2 | Sulfolane | Complete | 13138 | 3.6 | 187.9 | 391.65 | 0.35 | 0.63 |
| 10 | MDI | LiCl | BPGE | BPGE | 2 | Sulfolane | Complete | 11220 | 5.07 | 175.3 | 345 | n.d. | 0.11 | comp.: comparative example,
n.s.: not soluble,
n.d. not determined
Addition protocol 1: Solution of diisocyanate compound (A) is added to a solution of bisepoxide compound (B) the catalyst (C) and the compound (D).
Addition protocol 2: A solution of the diisocyanate compound (A), the bisepoxide compound (B) and the compound (D) is added to the reactor containing the catalyst (C) dissolved in the solvent (E-1) comprising the solvent (E-1) according to claim 1 of the present application.
X(A): Conversion of isocyanates as compound (A) after step (β) estimated by IR spectroscopy of the reaction mixture.
PDI Polydispersity index (PDI) defined as ratio of the weight average molecular weight and the number average molecular weight determined by GPC
Δwt % weight loss percentage of the sample after treatment at 240° C. and 260° C. for 1 h, respectively, with respect to the thermoplastic polyoxazolidinone (D) obtained in step (β), determined by TGA.

The invention claimed is:

1. A process for producing thermoplastic polyoxazolidinones comprising copolymerization of
a diisocyanate compound with a bisepoxide compound in the presence of components comprising a catalyst, a chain regulator comprising a monofunctional epoxide, a monofunctional isocyanate, or a mixture thereof, and a solvent composition comprising a polar aprotic solvent, wherein
the catalyst comprises an alkali halogenide, an earth alkali halogenide, or a transition metal halogenide, and wherein 5. The process according to claim 1, wherein the at least one of a monofunctional epoxide and monofunctional isocyanate comprises phenyl glycidyl ether, o-kresyl glycidyl ether, m-kresyl glycidyl ether, p-kresyl glycidyl ether, 4-tert-butylphenyl glycidyl ether, phenyl glycidyl ether, 1-naphthyl glycidyl ether, 2-naphthyl glycidyl ether, 4-chlorophenyl glycidyl ether, 2,4,6-trichlorophenyl glycidyl ether, 2,4,6-tribromophenyl glycidyl ether, pentafluorophenyl glycidyl ether, cyclohexyl glycidyl ether, benzyl glycidyl ether, glycidyl benzoate, glycidyl acetate, glycidyl cyclohexylcarboxylate, methyl glycidyl ether, ethyl glycidyl ether, butyl glycidyl ether, hexyl glycidyl ether, 2-ethylhexyl glycidyl ether, octyl glycidylether, a C10-C18 alkyl glycidyl ether, allyl glycidyl ether, ethylene oxide, propylene oxide, styrene oxide, 1,2-butene oxide, 2,3-butene oxide, 1,2-hexene oxide, an oxide of a C10-C18 alpha-olefin, cyclohexene oxide, vinylcyclohexene monoxide, limonene monoxide, butadiene monoepoxide, N-glycidyl phthalimide, n-hexylisocyanate, 4-tert-butylphenyl glycidyl ether, cyclohexyl isocyanate, ω-chlorohexamethylene isocyanate, 2-ethyl hexyl isocyanate, n-octyl isocyanate, dodecyl isocyanate, stearyl isocyanate, methyl isocyanate, ethyl isocyanate, butyl isocyanate, isopropyl isocyanate, octadecyl isocyanate, 6-chloro-hexyl isocyanate, cyclohexyl isocyanate, 2,3,4-trimethylcyclohexyl isocyanate, 3,3,5-trimethylcyclohexyl isocyanate, 2-norbornyl methyl isocyanate, decyl isocyanate, dodecyl isocyanate, tetradecyl isocyanate, hexadecyl isocyanate, octadecyl isocyanate, 3-butoxypropyl isocyanate, 3-(2-ethylhexyloxy)-propyl isocyanate, (trimethylsilyl)isocyanate, phenyl isocyanate, ortho-, meta-, or para-tolyl isocyanate, a 2,3,4 isomer of chlorophenyl isocyanate, dichlorophenyl isocyanate, 4-nitrophenyl isocyanate, 3-trifluoromethylphenyl isocyanate, benzyl isocyanate, dimethylphenylisocyanate, dodecylphenylisocyanate, 4-cyclohexyl-phenyl isocyanate, 4-pentyl-phenyl isocyanate, 4-t-butyl phenyl isocyanate, 1-naphthyl isocyanate, or a combination of two or more thereof.

6. The process according to claim 1, wherein the polar aprotic solvent comprises sulfolane, dimethylsulfoxide, gamma-butyrolactone, or a combination of two or more thereof.

7. The process according claim 1, wherein the alkylene oxide comprises a monofunctional alkylene oxide and/or a polyfunctional alkylene oxide.

8. The process according to claim 7, wherein the alkylene oxide comprises a monofunctional alkylene oxide comprising phenyl glycidyl ether, o-kresyl glycidyl ether, m-kresyl glycidyl ether, p-kresyl glycidyl ether, 4-tert-butylphenyl glycidyl ether, phenyl glycidyl ether, 1-naphthyl glycidyl ether, 2-naphthyl glycidyl ether, 4-chlorophenyl glycidyl ether, 2,4,6-trichlorophenyl glycidyl ether, 2,4,6-tribromophenyl glycidyl ether, pentafluorophenyl glycidyl ether, cyclohexyl glycidyl ether, benzyl glycidyl ether, glycidyl benzoate, glycidyl acetate, glycidyl cyclohexylcarboxylate, methyl glycidyl ether, ethyl glycidyl ether, butyl glycidyl ether, hexyl glycidyl ether, 2-ethylhexyl glycidyl ether, octyl glycidylether, a C10-C18 alkyl glycidyl ether, allyl glycidyl ether, ethylene oxide, propylene oxide, styrene oxide, 1,2-butene oxide, 2,3-butene oxide, 1,2-hexene oxide, an oxide of a C10-C18 alpha-olefin, cyclohexene oxide, vinylcyclohexene monoxide, limonene monoxide, butadiene monoepoxide N-glycidyl phthalimide, 4-tert-butylphenyl glycidyl ether or a combination of any two or more thereof.

9. The process of claim 1, wherein the solvent composition comprises dichlorobenzene and sulfolane.

10. The process of claim 1, wherein steps (a) and (b) are performed at a reaction temperature of ≥130° C. to ≤280° C. and a reaction time of 1 hour to 6 hours.

11. The process of claim 1, wherein the calculated weight ratio of the sum of the weight of diisocyanate compound, bisepoxide compound, and chain regulator used to the sum of the weight of diisocyanate compound, bisepoxide compound, chain regulator, and polar aprotic solvent used in step (a) is from 8 wt-% to 26 wt-%.

12. The process of claim 1, wherein the calculated weight ratio of the sum of the weight of diisocyanate compound, bisepoxide compound, and chain regulator used to the sum of the weight of diisocyanate compound, bisepoxide compound, chain regulator, and polar aprotic solvent used in step (a) is from 13 wt-% to 24 wt-%.

13. A thermoplastic polyoxazolidinone obtained by a process according to claim 1.

14. A thermoplastic polyoxazolidinone according to claim 13 with a number average molecular weight Mn from ≥500 to ≤500,000 g/mol as determined with gel permeation chromatography (GPC).

15. A process for producing a thermoplastic polyoxazolidinone comprising copolymerization of
a diisocyanate compound with a bisepoxide compound in the presence of components comprising a catalyst, a chain regulator comprising a monofunctional epoxide, a monofunctional isocyanate, or a mixture thereof, and a solvent composition comprising a polar aprotic solvent, wherein
the catalyst comprises an alkali halogenide, an earth alkali halogenide, or a transition metal halogenide, and wherein
the process comprises:
(a) placing the polar aprotic solvent and the catalyst in a reactor to provide a mixture,
(b) adding the diisocyanate compound, the bisepoxide compound and the chain regulator to the mixture resulting from step (a) to form a thermoplastic polyoxazolidinone, and
(c) reacting the thermoplastic polyoxazolidinone with an alkylene oxide,
wherein a calculated weight ratio of the sum of the weight of diisocyanate compound, bisepoxide compound, and chain regulator used to the sum of the weight of diisocyanate compound, bisepoxide compound, chain regulator, and polar aprotic solvent used in step (a) is from 5 wt % to 26 wt %,
wherein steps (a) and (b) are performed at a reaction temperature of ≥130° C. to ≤280° C. and a reaction time of 1 hour to 6 hours, and
wherein the thermoplastic polyoxazolidinone has a number average molecular weight of ≥5,000 to ≤500,000 g/mol as determined with gel permeation chromatography (GPC).

16. The process of claim 15, wherein the solvent composition comprises dichlorobenzene and sulfolane.

17. The process of claim 15, wherein the chain regulator comprises the monofunctional epoxide.

18. The process of claim 15, wherein the calculated weight ratio of the sum of the weight of diisocyanate compound, bisepoxide compound, and chain regulator used to the sum of the weight of diisocyanate compound, bisepoxide compound, chain regulator, and polar aprotic solvent used in step (a) is from 8 wt % to 26 wt %.

19. The process of claim 15, wherein the calculated weight ratio of the sum of the weight of diisocyanate compound, bisepoxide compound, and chain regulator used to the sum of the weight of diisocyanate compound, bisepoxide compound, chain regulator, and polar aprotic solvent used in step (a) is from 13 wt % to 24 wt %.

20. A thermoplastic polyoxazolidinone obtained by a process according to claim 15.

* * * * *

UNITED STATES PATENT AND TRADEMARK OFFICE
CERTIFICATE OF CORRECTION

| | |
|---|---|
| PATENT NO. | : 11,299,577 B2 |
| APPLICATION NO. | : 16/642147 |
| DATED | : April 12, 2022 |
| INVENTOR(S) | : Carsten Koopmans et al. |

It is certified that error appears in the above-identified patent and that said Letters Patent is hereby corrected as shown below:

In the Claims

In Column 24, at Line 16, in Claim 2, please cancel the duplicate text "the" before "the diisocyanate compound,"

In Column 24, at Line 20, in Claim 3, please cancel the duplicate text "the" before "the diisocyanate compound,"

Signed and Sealed this
Thirty-first Day of May, 2022

Katherine Kelly Vidal
*Director of the United States Patent and Trademark Office*